United States Patent [19]

Kaneyuki

[11] Patent Number: 4,653,349
[45] Date of Patent: Mar. 31, 1987

[54] AUXILIARY DEVICE DRIVING UNIT DRIVEN BY AN ENGINE

[75] Inventor: Kazutoshi Kaneyuki, Himeji, Japan

[73] Assignee: Mitsubishi Denki Kabushiki Kaisha, Tokyo, Japan

[21] Appl. No.: 712,092

[22] Filed: Mar. 15, 1985

[30] Foreign Application Priority Data

Mar. 23, 1984 [JP] Japan .............................. 59-42001[U]

[51] Int. Cl.[4] ........................ F16H 15/50; F16H 15/16
[52] U.S. Cl. .................................... 74/796; 74/336 B; 74/191
[58] Field of Search ................ 74/796, 336 B, 336 R, 74/752 D, 191, 190, 192, 193; 474/86, 87

[56] References Cited

U.S. PATENT DOCUMENTS

| 2,886,986 | 5/1959 | Kopp | 74/191 X |
| 2,903,083 | 9/1959 | Kelley | 74/336 B X |
| 2,910,891 | 11/1959 | Heckethorn | 74/336 B X |
| 2,964,959 | 12/1960 | Beck et al. | 74/336 B |
| 3,023,642 | 3/1962 | Maichen | 74/796 |
| 3,108,496 | 10/1963 | Kashihara | 74/796 |
| 3,108,497 | 10/1963 | Kashihara | 74/796 |
| 4,232,561 | 11/1980 | Kashihara et al. | 74/191 |
| 4,265,135 | 5/1981 | Smirl | 74/336 B |
| 4,305,488 | 12/1981 | McIntosh | 74/336 B X |
| 4,322,798 | 3/1982 | McCoin | 74/191 X |
| 4,502,345 | 3/1985 | Butterfield | 74/336 B |

FOREIGN PATENT DOCUMENTS

| 805596 | 5/1951 | Fed. Rep. of Germany . | |
| 2423746 | 9/1982 | Fed. Rep. of Germany . | |
| 70079 | 3/1982 | Japan . | |
| 47061 | 3/1982 | Japan | 74/796 |
| 84384 | 6/1983 | Japan . | |
| 163885 | 9/1983 | Japan | 74/796 |
| 180840 | 11/1983 | Japan . | |
| 151656 | 8/1984 | Japan | 74/796 |

Primary Examiner—Leslie Braun
Assistant Examiner—D. Wright
Attorney, Agent, or Firm—Oblon, Fisher, Spivak, McClelland & Maier

[57] ABSTRACT

An auxiliary device driving unit driven by an engine comprises an input member fixed to a crank shaft of the engine and provided with a disc-like portion and a cylindrical portion, an output member placed opposing the disc-like portion in a freely rotatable manner, the output member having the same axial center as the cylindrical portion of the input member, a plurality of planet cone members in a conical shape which are supported by the outer peripheries of the input and output members through partial contact, a speed change ring which is in contact with the cone generatrix of said planet cone members and is movable along the same axial center line as the input member, a speed change shaft having a feeding means for controlling movement of the speed change ring in the axial direction, a motor for rotating the speed change shaft, an electric circuit for controlling the motor, a driven member which is coupled to the output member through a ball cam and is rotatable on said cylindrical portion of input member and a crank pulley fixedly supported by the driven member.

5 Claims, 6 Drawing Figures

FIGURE 2
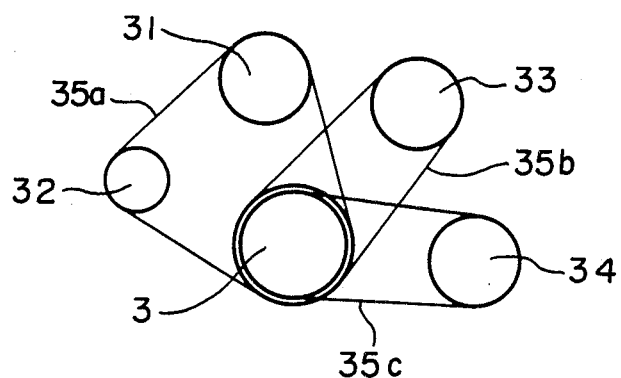
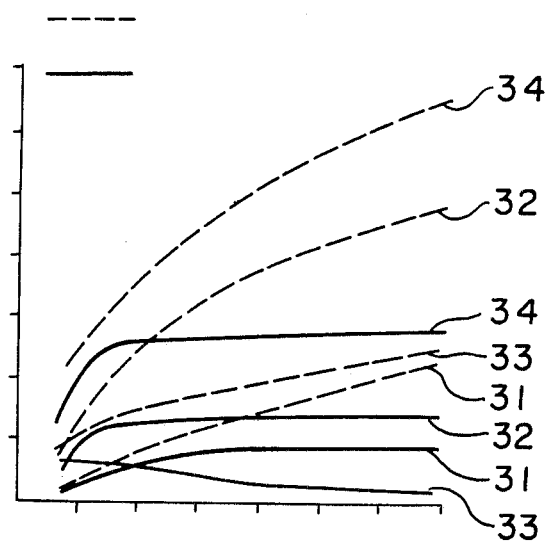
FIGURE 3

AUXILIARY DEVICE DRIVING UNIT DRIVEN BY AN ENGINE

BACKGROUND OF THE INVENTION

The present invention relates to a controlling unit for controlling revolution of auxiliary devices driven by an engine for a machine such as a car.

A conventional auxiliary device driving unit will be described with reference to FIGS. 1 and 2 in which a crank shaft 2 extends from an engine 1, a crank pulley 3 provided at the outer peripheral surface with grooves 3a in which V-belts are wound is connected to the crank shaft 2 by means of a bolt 4. FIG. 2 is a diagram showing a layout of pulleys for auxiliary devices and the crank pulley 3. A rotational force of the crank pulley 3 is transmitted to the auxiliary devices i.e. a water pump 31, a charging generator 32, an oil pump for power-steering 33 and a compressor for air-conditioning 34 through transmitting belts 35a, 35b, 35c.

Generally, revolutional speed of an engine of a car should be applicable at a wide range. Accordingly, a ratio of transmission of speed is so determined that performance of each auxiliary device is satisfactory even when revolution of the engine is low. The ratio of transmitting speed is determined to increase revolutional speed of auxiliary devices e.g. about 1.0–1.2 for the water pump 31, about 2.0–3.0 for the charging generator 32, about 1.0–1.2 for the oil pump 33 and about 1.0–1.3 for the compressor 34.

The revolutional speed of the engine largely depends on the travelling speed of a car. Therefore, a revolutional speed range of each of the auxiliary devices operated at an increased speed ratio becomes extensively broad. Particularly, in a high speed region, efficiency of operations decreases while consumption horsepower increases, whereby a ratio of travelling distance to a specified amount of fuel (hereinbelow referred to as a fuel ratio) and dynamic performance of the car decreases. Namely, as shown in FIG. 3 showing relations of work per a unit time (hereinbelow referred to as power) and consumption horsepower of each of the auxiliary devices to revolutional speed of an engine, the power output is maximum when the revolutional speed of the engine reaches a certain value, while the consumption horsepower increases at a substantially constant rate. Accordingly, the efficiency of operation is extremely reduced in a high speed region.

SUMMARY OF THE INVENTION

It is an object of the present invention to prevent reduction in a fuel ratio and dynamic performance of an engine without unnecessarily increasing speed of operating auxiliary devices driven by a crank pulley of the engine, by operating the engine efficiency.

It is another object of the present invention to provide an auxiliary device driving unit usable instead of the conventional crank pulley to minimize a space for installation.

It is still another object of the present invention to provide an auxiliary device driving unit effective to save power of auxiliary devices and allowing operations without any shock at the time of changing speed.

Further purpose of the present invention is to prolong the life time of auxiliary devices by controlling operating speed of the auxiliary devices.

The foregoing and the other objects of the present invention have been attained by providing an auxiliary device driving unit driven by an engine which comprises an input member fixed to a crank shaft of the engine and provided with a disc-like portion and a cylindrical portion, an output member placed opposing the disc-like portion in a freely rotatable manner, the output member having the same axial center as the cylindrical portion of the input member, a plurality of planet cone members in a conical shape which are supported by the outer peripheries of the input and output members through partial contact, a speed change ring which is in contact with the cone generatrix of the planet cone members and is movable along the same axial center line as the input member, a speed change shaft having a feeding means for controlling movement of the speed change ring in the axial direction, a motor for rotating the speed change shaft, an electric circuit for controlling the motor, a driven member which is coupled to the output member through a ball cam and is rotatable on the cylindrical portion of input member and a crank pulley fixedly supported by the driven member.

BRIEF DESCRIPTION OF THE DRAWINGS

In the drawings

FIG. 2 is a diagram showing an layout of belt-driven auxiliary devices;

FIG. 3 is a graph showing a relation of power and consumption horsepower of each of the auxiliary devices to revolutional speed of an engine;

DETAILED DESCRIPTION OF THE PREFERRED EMBODIMENTS

A preferred embodiment of the present invention will be described with reference to drawing.

Figure 1:
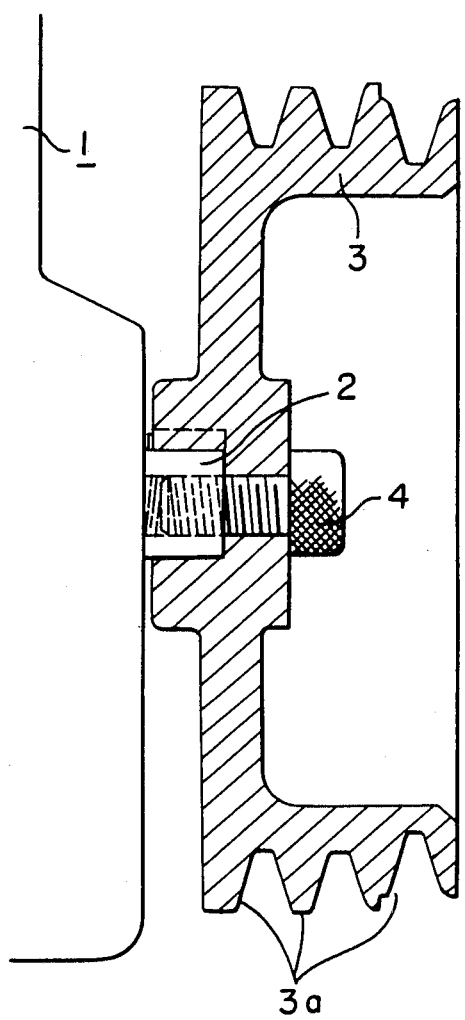
FIG. 1 is a side view partly cross-sectioned of an important part of a conventional auxiliary device driving unit driven by an engine.
Figure 4:
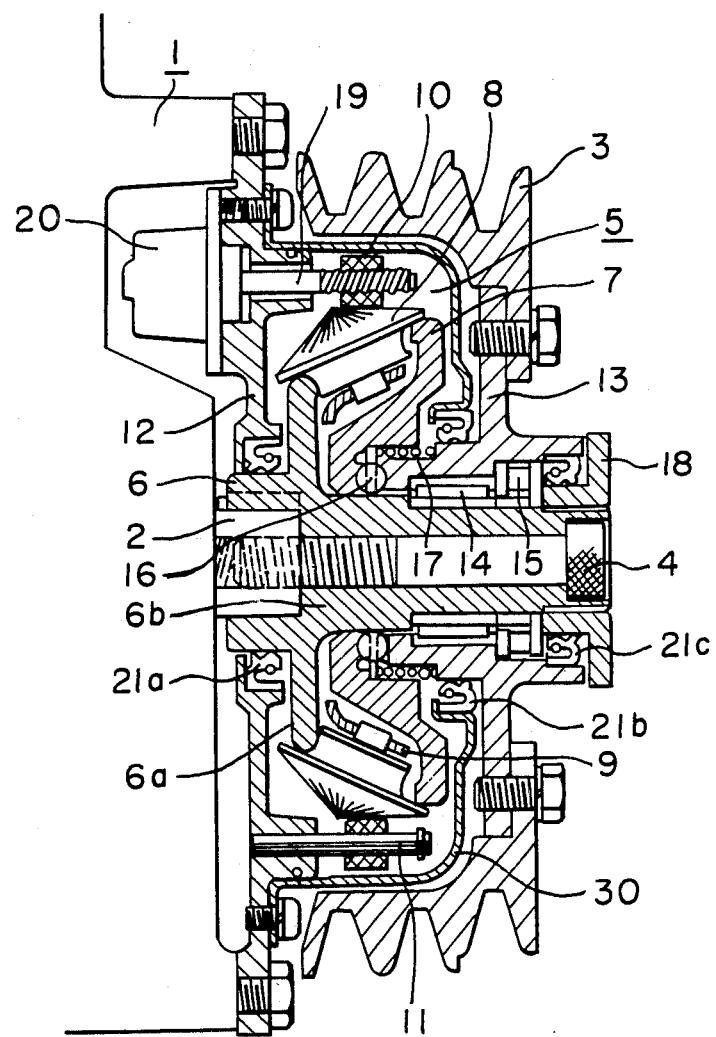
FIG. 4 is a side view partly cross-sectioned of an important part of an embodiment of the auxiliary device driving unit according to the present invention.

In FIG. 4, a reference numeral 1 designates the main body of an engine, a numeral 2 designates a crank shaft, a numeral 5 designates a frictional transmission type stepless speed variator, the fundamental construction of the stepless speed variator being disclosed in Japanese Examined Patent Publication 13221/1982 (U.S. Pat. No. 4,232,561). The frictional transmission type stepless speed variator 5 used for the driving unit of the present invention is constituted as follows. An input member comprising a disc-like portion 6a and a cylindrical portion 6b is firmly connected to the crank shaft 2 by a bolt 4. An output member 7 is placed opposing the disc-like portion 6a and in coaxial with the cylindrical portion 6b of the input member 6. A plurality of planet cone members 8, each having a conical portion and column-like base portion having a diameter smaller than the conical portion, are supported by the input and output members 6, 7 in such a manner that the peripheral edge of the disc-like portion of the input member 6 is in contact with the outer periphery of the base portion and the outer peripheral edge of the output member 7 is in contact with the bottom surface of the conical portion.

A carrier 9 supports a shaft of each of the planet cone members 8 extending from the lower surface of the base portion at equivalent intervals in a circle line. A speed change ring 10 which is formed in a ring form similar to the input and output members 6, 7 is in contact with the cone generatrix of the planet cone members 8. The speed change ring 10 is supported by pins 11 so as to be slidable along the axial line of the crank shaft 2. The pins 11 are fixedly supported by a fixed circular plate 12 which is in turn secured to the main body of the engine 1 by means of bolts and so on. A driven member 13 is rotatably supported on the cylinderical portion of the input member 6 through a radial bearing 14. A ball cam 16 is interposed between the output member 7 and the driven member 13 to transmit power from one to the other and at the same time produces an axial force by a component of a transmission to torque. A spring 17 is fitted between the output member 7 and the driven member 13 to provide a pressure in the axial direction. A nut 18 is engaged with an outer screw portion formed at the top end of the cylindrical portion of the input member 6 to secure an inner ring of the radial bearing 14 and a side ring of a thrust-bearing 15 to the input member 6. A stepping motor 20 is fixed to the circular plate 12 and a speed change shaft 19 is connected to a driving shaft of the stepping motor 20. The speed change shaft 19 is engaged with the speed change ring 10 by means of a feeding screw structure so that revolution of the speed change shaft 19 causes movement of the speed change ring 10 in the axial direction. The crank pulley 3 is attached to the driven member 13 in a coaxial manner by means of groove fitting and bolts. Reference numerals 21a, 21b, 21c respectively designate oil seals for sealing lubricating oil for frictional transmission and a numeral 30 designates a seal plate.

Figure 5:
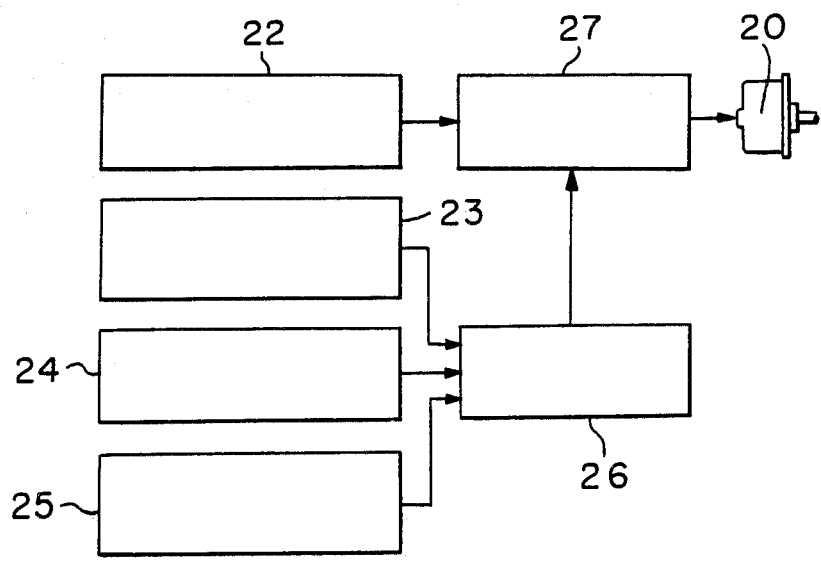
FIG. 5 is a block diagram of a control circuit used for the present invention.

FIG. 5 is a block diagram showing an example of the control circuit of a stepping motor 20 for controlling position of the speed change ring 10, in which a reference numeral 22 designates an engine speed detecting circuit, a numeral 23 designates a load detecting circuit for a charging generator, a numeral 24 designates a load detecting circuit for a compressor, a numeral 25 designates a cooling water temperature detecting circuit, a numeral 26 designates a speed changing point operating circuit for determining a speed changing point at which the crank pulley 3 is decelerated and a numeral 27 designates a stepping motor controlling circuit.

Figure 6:
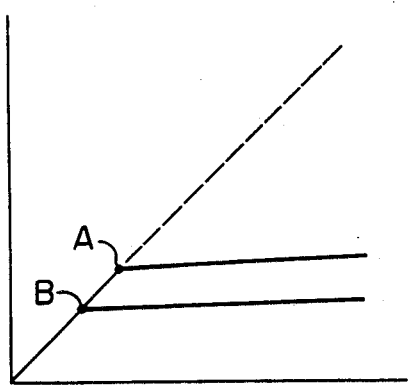
FIG. 6 is a diagram showing a relation of revolutional speed of an engine to revolutional speed of a crank pulley.

FIG. 6 is a diagram showing a relation of revolutional speed of an engine to revolutional speed of the crank pulley in accordance with the present invention.

The operation of the embodiment having the above-mentioned construction will be described. The operation of the frictional transmission type stepless speed variator 5 is performed as follows. The driving force of the input member 6 causes rotation of the planet cone members 8 around their own vertical axes by frictional transmission, while they roll along the inner surface of the speed change ring 10. The driving force of the input member 6 is transmitted to the output member 7 by difference in speed between rotation around their own axes and the revolution along the inner surface of the speed change ring 10 and a speed changing ratio based on a radius of contact for frictional transmission between the output member 7 and the planet cone members 8. The speed changing ratio can be determined as desired by shifting the speed change ring 10 in the axial direction because the speed of revolution of the planet cone members can be changed depending on a position of contact of the speed change ring 10 against the cone generatrix of the planet cone members 8. For example, the speed changing ratio can be small by shifting the speed change ring 10 on the side of the top of the cone of the planet cone members 8 in FIG. 4. Conversely, the speed changing ratio can be large by shifting the speed change ring 10 in the opposite direction.

When a torque is transmitted between the output member 7 and the driven member 13 to which the crank pulley 3 is connected, an axial force is produced. By using the axial force, the ball cam 16 provides a force normal to a contacting surface so as to correspond to the transmitting torque, the force being necessary for the frictional transmission among the planet cone members 8, the input member 6, the output member 7 and the speed change ring 10. The position of the speed change ring 10 can be controlled by turning the speed change shaft 19 connected to the driving shaft of the stepping motor 20 by means of the feeding screw structure. Accordingly, the torque transmission from the crank shaft 2 to the crank pulley 3 can be performed at a desired revolution speed ratio. The control circuit of the stepping motor 20 can be constituted as shown in FIG. 5. With the control circuit, when the revolution speed of the engine is low, the crank pulley 3 is operated at a constant speed changing ratio, e.g. a synchronous speed of 1.0. At the time of middle or high speed, a revolutional speed corresponding to conditions of loads and the capacity of the auxiliary devices is selected whereby the crank pulley 3 can be controlled to rotate at a substantially constant rate regardless of the revolutional speed of the engine (FIG. 6). Selection of speed rate changing point A or B is determined from revolutional speed required to operate each of the auxiliary devices by detecting condition of loads of the charging generator, the compressor and so on and the capacity of the water pump which depends on the temperature of water for cooling the engine.

Description will be made as to determination of the speed ratio changing points A, B. The revolutional speed of the crank pulley which corresponds to the revolutional speed which renders efficiency of the auxiliary devices to be almost maximum in operation (a point at which saturation of the characteristic curve of power is initiated in FIG. 3) is determined as a point A. Also, the revolutional speed of the crank pulley corresponding to minimum revolutional speed required for previously determined condition of damped operation for each auxiliary device (the damped operation refers to a condition of operation in which application of an output current of I/2 amperes is sufficient under a certain condition of operation although an output current of I amperes is normally required for a charging generator among auxiliary devices) is determined as a point B. The selection of either the point A or the point B is made depending on circumstances of loads imposed on the auxiliary devices or whether the capacity of operation required for the auxiliary devices exceeds the condition of the damped operation.

I claim:

1. In an engine having at least one auxiliary device, an auxiliary device driving unit driven by said engine and which comprises:

an input member fixed to a crank shaft of said engine and provided with a disc-like portion and a cylindrical portion;

an output member placed opposing said disc-like portion in a freely rotatable manner, said output member having the same axial center as said cylindrical portion of said input member, a plurality of planet cone members in a conical shape which are supported by the outer peripheries of said input and output members by partial contact, a speed change ring which is in contact with the cone generatrix of said planet cone members and is movable along the same axial center line as said input member to permit a continuous variation of a speed ratio between said input and output members, a speed change shaft having means for moving said speed change ring in the axial direction in response to rotation of said speed change shaft, a motor for rotating said speed change shaft, a driven member which is coupled to said output member through a ball cam and is rotatable on said cylindrical portion of input member, a crank pulley fixedly supported by said driven member and driving said auxiliary device, and electric control means responsive to auxiliary device load conditions and having means for controlling said motor such that said speed ratio remains fixed at engine speeds below a speed ratio changing point set as a function of said load conditions and such that said speed ratio may be permitted to continuously vary at engine speeds above said speed ratio changing point.

2. In the engine of claim 1, the auxiliary device driving unit wherein each of said planet cone members comprises a conical portion and a column-like base portion having a diameter smaller than said conical portion in which the peripheral edge of said disc-like portion of said input member is in contact with the outer periphery of said base portion and the outer peripheral edge of said output member is in contact with the bottom surface of said conical portion.

3. In the engine of claim 1, the auxiliary device wherein said means for controlling said motor includes means for varying said speed ratio at engine speeds above said speed ratio changing point such that said crank pulley rotates at a fixed rotational speed for any engine speed above said speed ratio changing point.

4. In an engine having at least one auxiliary device, an auxiliary device driving unit comprising:

a continuously variable transmission having input means driven by said engine, output means for driving said at least one auxiliary device, means for driving said output means at a settable speed ratio with respect to said input means and means for varying said speed ratio;

means for sensing the speed of said engine;

means for sensing load conditions of said at least one auxiliary device;

electric means for determining a speed ratio changing point as a function of said load conditions; and electric means for controlling said means for varying to vary said speed ratio only for sensed engine speeds above said speed ratio changing point.

5. In the engine of claim 4, said electric means for controlling further comprising means for controlling said means for varying to vary said speed ratio such that a rotational speed of said output means is constant for any engine speed above said speed ratio changing point.

* * * * *